US012668310B2

(12) United States Patent
Schwering et al.

(10) Patent No.: US 12,668,310 B2
(45) Date of Patent: Jun. 30, 2026

(54) MOTOR VEHICLE BODY WITH A LATERAL PART STRUCTURE, IN PARTICULAR A COLUMN, AND METHOD FOR ASSEMBLING A MOTOR VEHICLE BODY COMPRISING SUCH A LATERAL PART STRUCTURE

(71) Applicant: Volkswagen Aktiengesellschaft, Wolfsburg (DE)

(72) Inventors: Christian Schwering, Gross Hesepe (DE); Thomas Paulsen, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 346 days.

(21) Appl. No.: 18/527,262

(22) Filed: Dec. 2, 2023

(65) Prior Publication Data

US 2024/0092429 A1    Mar. 21, 2024

Related U.S. Application Data

(63) Continuation of application No. PCT/EP2022/061673, filed on May 2, 2022.

(30) Foreign Application Priority Data

Jun. 2, 2021    (DE) ..................... 10 2021 205 634.2

(51) Int. Cl.
B62D 25/04          (2006.01)

(52) U.S. Cl.
CPC .................................. B62D 25/04 (2013.01)

(58) Field of Classification Search
None
See application file for complete search history.

(56) References Cited

U.S. PATENT DOCUMENTS 5,042,872 A  *  8/1991  Yoshii .................... B62D 25/04
                                              296/203.02
5,586,799 A  *  12/1996  Kanemitsu ........... B62D 25/081
                                              296/203.02

(Continued)

FOREIGN PATENT DOCUMENTS

DE      102007011719 A1    9/2008
DE      102008036868 A1    2/2010

(Continued)

OTHER PUBLICATIONS

International Search Report dated Sep. 9, 2022 in corresponding application PCT/EP2022/061673.

*Primary Examiner* — Aaron L Lembo
(74) *Attorney, Agent, or Firm* — Muncy, Geissler, Olds & Lowe, P.C.

(57)          ABSTRACT

A motor vehicle body having a lateral part structure, at least partly comprising a pillar outer shell, a pillar inner shell that is connected to the pillar outer shell, and a door hinge reinforcement element that is arranged in an intermediate space between the pillar outer shell and the pillar inner shell. The pillar inner shell and the pillar outer shell are designed such that the intermediate space has an access opening that leads directly to the region of the door hinge reinforcement element when the pillar inner shell and the pillar outer shell are in a state of having been brought together in the final assembly position.

13 Claims, 2 Drawing Sheets

(56) References Cited

U.S. PATENT DOCUMENTS

| | | | |
|---|---|---|---|
| 6,942,277 B2 | 9/2005 | Rangnekar et al. | |
| 7,090,273 B2 * | 8/2006 | Stojkovic | B62D 25/04 |
| | | | 296/187.02 |
| 7,841,650 B2 | 11/2010 | Chen et al. | |
| 8,007,025 B2 | 8/2011 | Köhr et al. | |
| 8,469,442 B1 | 6/2013 | Pencak et al. | |
| 8,651,563 B2 * | 2/2014 | Mildner | B62D 25/14 |
| | | | 296/203.02 |
| 8,919,868 B2 * | 12/2014 | Nortmann | B62D 21/157 |
| | | | 296/193.06 |
| 9,315,214 B2 | 4/2016 | Neufeldt et al. | |
| 10,093,359 B2 * | 10/2018 | Vigil | B62D 25/08 |
| 10,179,610 B2 * | 1/2019 | Nakamura | B62D 25/088 |
| 2003/0102695 A1 * | 6/2003 | Kim | B62D 25/04 |
| | | | 296/203.03 |
| 2009/0140551 A1 | 6/2009 | Stalhammar | |

FOREIGN PATENT DOCUMENTS

| | | |
|---|---|---|
| DE | 102010034939 A1 | 2/2012 |
| DE | 102012009307 A1 | 11/2013 |
| DE | 102012014117 A1 | 1/2014 |
| DE | 102014015749 A1 | 7/2015 |
| DE | 102014010582 A1 | 1/2016 |
| DE | 102014112138 A1 | 2/2016 |
| EP | 2011679 A1 | 1/2009 |
| EP | 2868553 A1 | 5/2015 |
| JP | H09226622 A | 9/1997 |
| JP | 6256520 B2 | 1/2018 |

* cited by examiner

MOTOR VEHICLE BODY WITH A LATERAL PART STRUCTURE, IN PARTICULAR A COLUMN, AND METHOD FOR ASSEMBLING A MOTOR VEHICLE BODY COMPRISING SUCH A LATERAL PART STRUCTURE

This nonprovisional application is a continuation of International Application No. PCT/EP2022/061673, which was filed on May 2, 2022, and which claims priority to German Patent Application No. 10 2021 205 634.2, which was filed in Germany on Jun. 2, 2021, and which are both herein incorporated by reference.

BACKGROUND OF THE INVENTION

Field of the Invention

The invention relates to a motor vehicle body having a lateral part structure, in particular a lateral part structure having an A-pillar. In addition, the invention relates to a method for assembling a motor vehicle body having such a lateral part structure.

Description of the Background Art

Known from DE 10 2014 112 138 A1 is a motor vehicle body in mixed construction, as well as a method for producing a motor vehicle body in mixed construction. Also disclosed there is a motor vehicle body with a lateral part structure that includes a rocker panel, an A-pillar, and a lateral roof frame. The document deals particularly with the connection between a ring-like lateral part structure and a vehicle floor structure.

Known from EP 2 868 553 A1, which corresponds to U.S. Pat. No. 8,469,442, is a motor vehicle body structure having an A-pillar that is composed of a pillar inner shell and a pillar outer shell, wherein the shells are joined to form a closed profile by the means that a front connecting flange is formed at the front in the longitudinal vehicle direction and a rear connecting flange is formed at the back in the longitudinal vehicle direction. The document deals particularly with the design of a dash wall and other elements for protecting the front connecting flange that are arranged in front of the A-pillar in the longitudinal vehicle direction. A door hinge reinforcement element and structural details for designing the A-pillar in a region where such a door hinge reinforcement element should be arranged are not disclosed.

Known from DE 10 2010 034 939 A1 is a motor vehicle body having a lateral front wall, an outer sidewall, and an angle bracket. A motor vehicle with such a motor vehicle body and a method for assembling such a motor vehicle body are also referenced. The document deals mainly with the arrangement and connection of the angle bracket relative to the lateral front wall and the outer sidewall. A door hinge reinforcement element and structural details for designing the A-pillar in a region where such a door hinge reinforcement element should be arranged are not disclosed.

SUMMARY OF THE INVENTION

It is therefore an object of the invention to provide a motor vehicle body having a lateral part structure, in particular having an A-pillar, as well as a method for assembling a motor vehicle body having such a lateral part structure, that permit simple, and thus cost-effective, assembly of these elements.

A motor vehicle body according to an example of the invention having a lateral part structure at least partly comprises a pillar outer shell, a pillar inner shell that is connected to the pillar outer shell, and a door hinge reinforcement element that is arranged in an intermediate space between the pillar outer shell and the pillar inner shell. In this case, the pillar inner shell and the pillar outer shell are designed such that the intermediate space has an access opening that leads directly to the region of the door hinge reinforcement element when the pillar inner shell and the pillar outer shell are in the state of having been brought together in the final assembly position. Such an access opening is preferably oriented forward in the longitudinal vehicle direction and formed by the means that the pillar inner shell and the pillar outer shell have a U-shaped geometry, at least in a horizontal cross-section extending over a portion of the door hinge reinforcement element, wherein the arms of the "U" of the geometry are oriented forward in the longitudinal vehicle direction. In particular, such a motor vehicle body relates to a pillar outer shell and a pillar inner shell of an A-pillar of a motor vehicle. A motor vehicle body designed in such a way has the advantage that the door hinge reinforcement element is still easily accessible through the access opening after assembly of the pillar inner shell and pillar outer shell, and can therefore be mounted and/or fixed in place with a manufacturing process that can be implemented cost-effectively. In particular, manufacturing processes are referred to in this context that require a two-sided accessibility, such as, e.g., welding with tong-like welding jigs or riveting. The formation of such a motor vehicle body has the further advantage that improved crash behavior can be produced, in particular in head-on crash load conditions. Improved crash behavior of this nature arises especially when the pillar outer shell and the pillar inner shell are not connected directly to one another, but instead only indirectly through an additional auxiliary element, wherein the auxiliary element is what then closes the access opening.

The pillar outer shell and the pillar inner shell can be part of an A-pillar of a motor vehicle, and the door hinge reinforcement element is arranged in the lower region of the A-pillar. Accordingly, the access opening also extends over at least the lower region of the A-pillar. The access opening preferably is arranged in the lower half, further preferably in the lower third, of the A-pillar. However, it can also extend over the entire height of the A-pillar.

The door hinge reinforcement element can be arranged above a side sill. In particular, reference is made in this respect to constructions in which the side sill is designed as a hollow profile, in particular in such a manner that a side sill reinforcement element is arranged in the section of the side sill adjacent to the A-pillar. The door hinge reinforcement element preferably is then arranged above the side sill. Especially preferred is an arrangement in which the door hinge reinforcement element is arranged directly above the side sill, preferably directly adjacent to a side sill reinforcement element arranged in the side sill.

The door hinge reinforcement element can be connected to the pillar outer shell and/or to the pillar inner shell by means of a joining method that requires a two-sided accessibility. In this regard, reference is made, in particular, to welding, especially spot welding, and riveting, but also adhesive bonding. Alternatively or in addition, reference is also made to other material-to-material, interlocking, and/or frictional joining methods, in particular those that are only possible on account of the good accessibility through the access opening or can be implemented easily and cost-effectively on account of the access opening.

The intermediate space can be accessible from the front in the longitudinal vehicle direction, because then a door hinge reinforcement element, especially when it is a U-profile, can be gripped easily with a tool in order to insert it and hold it in the desired position during mounting until mounting is completed. This is especially true for applications in which a U-profile with additional support flanges, whose direction of profile extension is oriented in the longitudinal vehicle direction, is employed as the door hinge reinforcement element. In such applications, the U-profile can be held at the arms, wherein the fixing in place of the U-profile can be accomplished by the support flanges and the covering surface that is separated by the arms, in particular in such a manner that the support flanges are fixed in place relative to the pillar inner shell and the covering surface is fixed in place relative to the pillar outer shell or vice versa.

The crash performance in head-on crash load conditions of a motor vehicle body according to the invention can be improved when the pillar outer shell has, at the front end viewed in the longitudinal vehicle direction, an outer shell support flange extending in the transverse vehicle direction and in the vertical vehicle direction, and/or the pillar inner shell has, at the front end viewed in the longitudinal vehicle direction, an inner shell support flange extending in the transverse vehicle direction and in the vertical vehicle direction. In this design, it has proven especially advantageous in connection with an easily accessible access opening when an outer shell support flange is oriented toward the exterior of the vehicle in the transverse vehicle direction and an inner shell support flange is oriented toward the interior of the vehicle in the transverse vehicle direction because the access opening then is not reduced in width on account of the respective flange.

The intermediate space can be closed at the front in the final assembled state, at least in the region of the door hinge reinforcement element, by an auxiliary element extending in the transverse vehicle direction and in the vertical vehicle direction. This auxiliary element can be, for example, an element extending over only a fraction of the vehicle width, such as a wheel well element, for example. However, the auxiliary element can also be a dash wall element extending over a majority of the width, in particular a dash wall element that extends outward from a center region of the vehicle past the pillar outer shells and the pillar inner shells. Alternatively or in addition, it can be an auxiliary element that extends over at least 50 percent, at least 70 percent, at least 80 percent, or more than 80 percent of the vehicle width. After the mounting of the door hinge reinforcement element, the connection of the auxiliary element to the inner shell support flange and to the outer shell support flange results in a closed structure that can absorb high forces even in head-on crash load conditions, with no danger of a splitting of the pillar inner shell and pillar outer shell.

The pillar inner shell and/or the pillar outer shell can be part of a ring-shaped door structure. This means that the pillar inner shell and/or the pillar outer shell are permanently connected to other elements that as a whole form a stiff, ring-shaped door structure that extends around a door opening of a motor vehicle. Additional stiffness advantages, especially in connection with head-on crash load conditions, are produced as a result.

The pillar inner shell and/or the pillar outer shell may be arranged adjacent to a side sill at the lower side.

The invention also relates to a method for assembling a motor vehicle body having a lateral part structure at least partly comprising a pillar outer shell, a pillar inner shell that is connected to the pillar outer shell, and a door hinge reinforcement element that is arranged in an intermediate space between the pillar outer shell and the pillar inner shell, according to which the pillar inner shell and the pillar outer shell are designed such that the intermediate space has an access opening that leads directly to the region of the door hinge reinforcement element when the pillar inner shell and the pillar outer shell are in the state of having been brought together in the final assembly position, wherein, in order to mount the door hinge reinforcement element, the door hinge reinforcement element is attached by means of welding or riveting to the pillar inner shell and/or to the pillar outer shell in the intermediate space through the access opening.

The access opening can be closed in a subsequent step by connection to an auxiliary element extending in the transverse vehicle direction and in the vertical vehicle direction.

The pillar outer shell and/or the pillar inner shell can have, on the front end viewed in the longitudinal vehicle direction, a support flange extending in the transverse vehicle direction and in the vertical vehicle direction, wherein the auxiliary element and the pillar inner shell and/or the pillar outer shell are connected to one another by positioning and fixing in place.

Reference is herewith made once again to the concrete possibilities for implementing the method according to the invention as well as the advantages associated therewith, which have already been described above in connection with the motor vehicle body.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
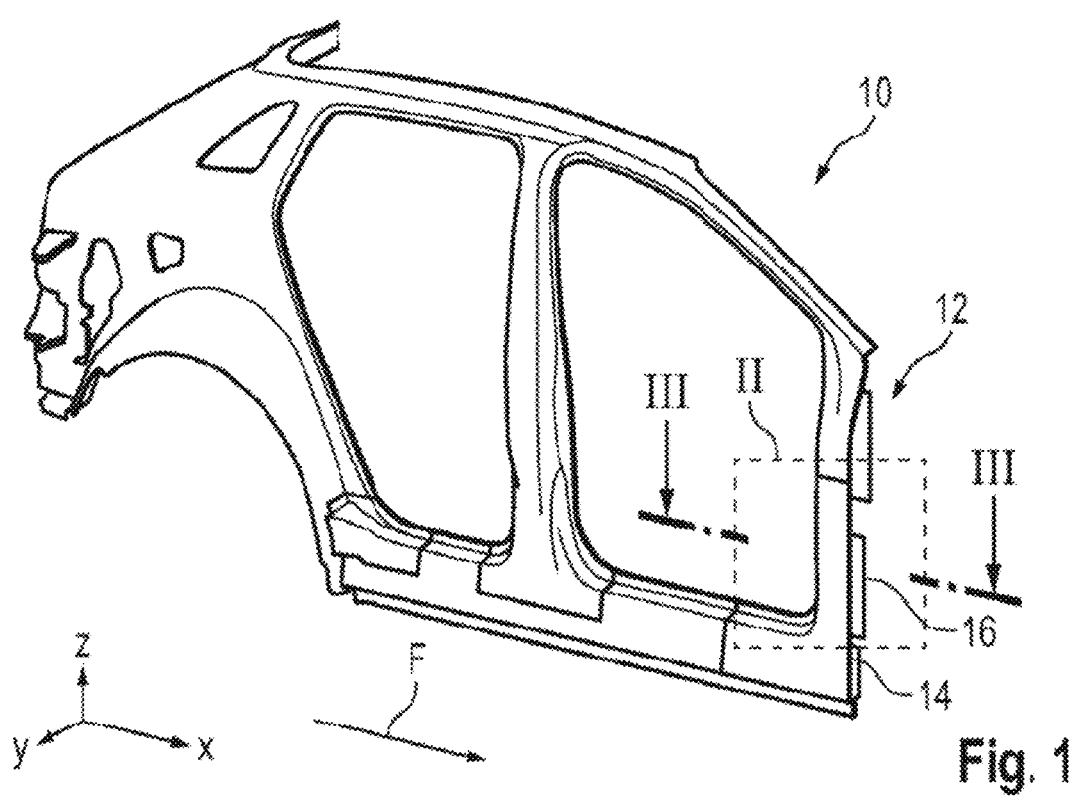
FIG. 1 shows an example of a motor vehicle body according to the invention having a lateral part structure in an isometric representation.

FIG. 1 shows a motor vehicle body 10 having a lateral part structure 12 that comprises a pillar outer shell 14 and a pillar inner shell 16. As is clearly visible in FIGS. 2 to 4, the pillar outer shell 14 and the pillar inner shell 16 are arranged relative to one another in such a manner that they have a distance a from one another in the final assembly position. This distance a is labeled in each of FIGS. 2 and 3 with a

Figure 3:
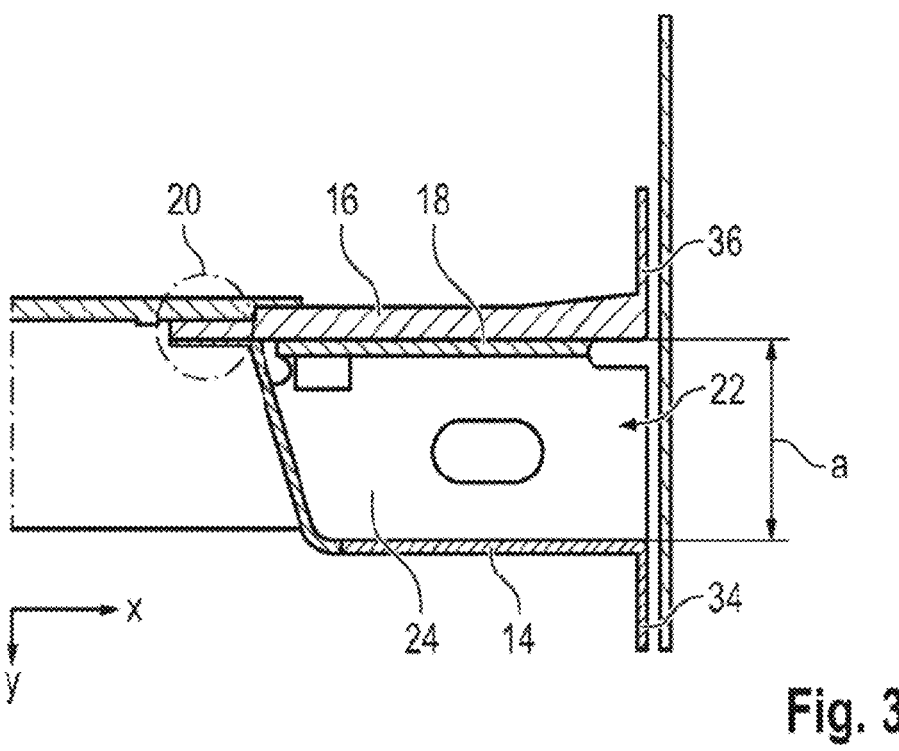
FIG. 3 shows a representation of the detail shown in FIG. 2 in a horizontal cross-section along the section lines III-III in FIG. 1.

5 double-headed arrow. On account of the distance a between the pillar outer shell 14 and the pillar inner shell 16, an intermediate space 18, which is shown hatched in FIG. 3, is produced between the pillar outer shell 14 and the pillar inner shell 16. As is clearly visible in FIG. 3, the intermediate space 18 extends in the longitudinal vehicle direction (x-direction) up to a region where the pillar outer shell 14 and the pillar inner shell 16 are connected to one another by a flange 20.

An access opening 22 extends over the distance a, which opening allows a door hinge reinforcement element 24 that is placed in the intermediate space 18 to be mounted there after the pillar outer shell 14 and the pillar inner shell 16 have already been brought together in the final assembly position and connected to one another.

Figure 2:
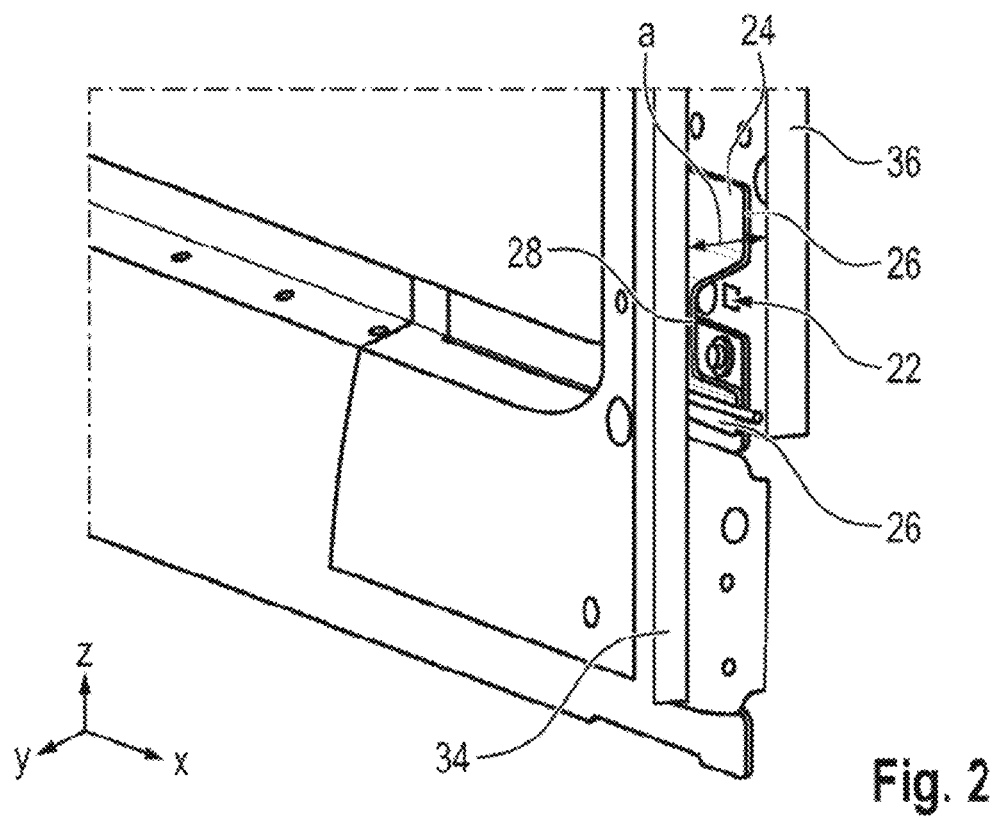
FIG. 2 shows the area labeled "II" in FIG. 1 in an enlarged representation.

As is clearly visible in FIG. 2, the door hinge reinforcement element 24 is designed as a U-profile in the example shown, and has two support flanges 26 as well as a covering surface 28. The support flanges 26 are brought into contact with the pillar inner shell 16 and permanently connected thereto, in particular by welding. The covering surface 28 is brought into contact with the pillar outer shell 14 and permanently connected thereto, in particular likewise by welding.

On account of the good accessibility to the support flanges 26 and to the covering surface 28, it is possible to carry out the connection between the door hinge reinforcement element 24 and the pillar outer shell 14 as well as the pillar inner shell 16 with the aid of a manufacturing process that requires a two-sided accessibility. In particular, the assembly can be carried out by spot welding by means of suitable welding tongs or alternatively by riveting.

Figure 4:
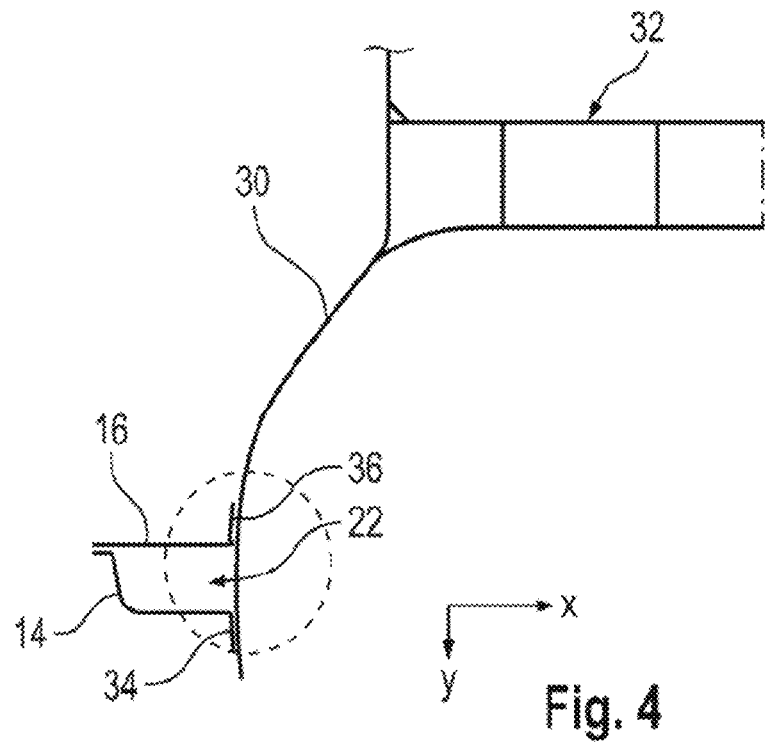
FIG. 4 shows a schematic representation of the horizontal cross-section from FIG. 3 with an auxiliary element closing the intermediate space at the front.

FIG. 4 shows a schematic representation of the horizontal cross-section from FIG. 3 without the inserted door hinge reinforcement element. Instead, in this figure it is clearly visible that the access opening 22 on the front side is closed after assembly with the aid of an auxiliary element 30. The auxiliary element 30 can be, in particular, a wheel well element that extends over only a small portion of the width extending in the y-direction of the motor vehicle or, as shown here, an element extending over a majority of the width, which extends from the lateral part structure 12 to a longitudinal member 32 of the motor vehicle, and from there even further toward the vehicle center. In the example shown in FIG. 4, the auxiliary element 30 extends over a majority of the vehicle width to the opposite side, which is designed symmetrically to the lateral part structure shown, which is to say that another lateral part structure 12 that is mirror symmetric to the lateral part structure 12 shown in FIG. 4 is provided on the opposite vehicle side.

It is also clearly visible in FIGS. 2 to 4 that an outer shell support flange 34, which extends outward in the transverse vehicle direction (y-direction) on the front end of the pillar outer shell 14, is formed on the pillar outer shell 14. Furthermore, it can be seen that an inner shell support flange 36, which extends toward the vehicle interior in the transverse vehicle direction (y-direction), is formed on the pillar inner shell 16.

The inner shell support flange 36 and the outer shell support flange 34 rest flat against the auxiliary element 30 and form a structure that is stiff for head-on crash load conditions and that withstands high forces and torques.

The features of the invention disclosed in the present description, in the drawings, and in the claims can be essential, both individually and in any desired combinations, for carrying out the invention in its various embodiments. The invention can be varied within the scope of the claims and while taking into account the knowledge of the competent skilled person.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A motor vehicle body comprising a lateral part structure comprising:
   a pillar outer shell;
   a pillar inner shell that is connected to the pillar outer shell; and
   a door hinge reinforcement element that is arranged in an intermediate space between the pillar outer shell and the pillar inner shell,
   wherein, in a final assembly position in which the pillar inner shell is brought together with the pillar outer shell, an access opening is formed by the pillar inner shell and the pillar outer shell that leads directly into the intermediate space to a region of the door hinge reinforcement element, such that the intermediate space and the door hinge reinforcement element arranged in the intermediate space remain accessible via the access opening after the pillar inner shell has been brought together with the pillar outer shell, and
   wherein the access opening is provided at a front of the intermediate space with respect to a longitudinal vehicle direction, such that the intermediate space is accessible from the front in the longitudinal vehicle direction.

2. The motor vehicle body according to claim 1, wherein the pillar outer shell and the pillar inner shell are part of an A-pillar, and wherein the door hinge reinforcement element is arranged in a lower region of the A-pillar.

3. The motor vehicle body according to claim 1, wherein the door hinge reinforcement element is connected to the pillar outer shell and/or to the pillar inner shell via a joining method that requires a two-sided accessibility.

4. The motor vehicle body according to claim 1, wherein, with respect to a longitudinal vehicle direction, a front end of the pillar outer shell and/or the pillar inner shell has a support flange extending in a transverse vehicle direction and in a vertical vehicle direction.

5. The motor vehicle body according to claim 1, wherein the access opening at the front of the intermediate space is closed, at least in the region of the door hinge reinforcement element, by an auxiliary element extending in the transverse vehicle direction and in the vertical vehicle direction.

6. The motor vehicle body according to claim 1, wherein the pillar inner shell and/or the pillar outer shell are part of a ring-shaped door structure, or wherein the pillar inner shell and/or the pillar outer shell are arranged adjacent to a side sill at a lower side.

7. The motor vehicle body according to claim 5, wherein, with respect to the longitudinal vehicle direction, a front end of the pillar outer shell and/or the pillar inner shell has a support flange extending in a transverse vehicle direction and in a vertical vehicle direction, and wherein the auxiliary element rests flat against the support flange of the pillar outer shell and/or the support flange of the pillar inner shell.

8. The motor vehicle according to claim 1, wherein the pillar inner shell and the pillar outer shell together form a U-shaped geometry in at least one horizontal cross-section, with legs of the U-shaped geometry extending forward in the longitudinal vehicle direction, such that the access opening is provided at the front of the intermediate space with respect to the longitudinal vehicle direction.

9. A method for assembling a motor vehicle body, the method comprising:

providing a lateral part structure comprising a pillar outer shell, a pillar inner shell that is connected to the pillar outer shell, and a door hinge reinforcement element that is arranged in an intermediate space between the pillar outer shell and the pillar inner shell;

forming the pillar inner shell and the pillar outer shell such that when the pillar inner shell and the pillar outer shell are in a final assembly position in which the pillar inner shell is brought together with the pillar outer shell, an access opening is formed by the pillar inner shell and the pillar outer shell that leads directly into the intermediate space to a region of the door hinge reinforcement element, such that the intermediate space and the door hinge reinforcement element arranged in the intermediate space remain accessible via the access opening after the pillar inner shell has been brought together with the pillar outer shell; and attaching the door hinge reinforcement element, via welding or riveting, to the pillar inner shell and/or to the pillar outer shell in the intermediate space through the access opening in order to mount the door hinge reinforcement element, wherein the access opening is provided at a front of the intermediate space with respect to a longitudinal vehicle direction, such that the intermediate space is accessible from the front in the longitudinal vehicle direction.

10. The method according to claim 9, wherein the access opening is closed in a subsequent step by connection to an auxiliary element extending in the transverse vehicle direction and in the vertical vehicle direction.

11. The method according to claim 10, wherein, with respect to the longitudinal vehicle direction, a front end of the pillar outer shell and/or the pillar inner shell has a support flange extending in a transverse vehicle direction and in a vertical vehicle direction, wherein the auxiliary element and the pillar inner shell and/or the pillar outer shell are connected to one another by positioning and fixing in place.

12. The method according to claim 11, wherein the auxiliary element rests flat against the support flange of the pillar outer shell and/or the support flange of the pillar inner shell.

13. The method according to claim 9, wherein the pillar inner shell and the pillar outer shell together form a U-shaped geometry in at least one horizontal cross-section, with legs of the U-shaped geometry extending forward in the longitudinal vehicle direction, such that the access opening is provided at the front of the intermediate space with respect to the longitudinal vehicle direction.

* * * * *